United States Patent
Deprun (10) Patent No.: US 8,745,101 B2
(45) Date of Patent: Jun. 3, 2014

(54) TERMINAL AND METHOD FOR IDENTIFYING CONTENTS

(75) Inventor: Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 416 days.

(21) Appl. No.: 12/864,639

(22) PCT Filed: Dec. 23, 2008

(86) PCT No.: PCT/KR2008/007622
§ 371 (c)(1),
(2), (4) Date: Jul. 26, 2010

(87) PCT Pub. No.: WO2009/102114
PCT Pub. Date: Aug. 20, 2009

(65) Prior Publication Data
US 2010/0318563 A1    Dec. 16, 2010

Related U.S. Application Data (60) Provisional application No. 61/027,750, filed on Feb. 11, 2008.

(51) Int. Cl.
*G06F 7/00* (2006.01)
*G06F 17/30* (2006.01)
*G06F 12/00* (2006.01)

(52) U.S. Cl.
CPC .... *G06F 17/30067* (2013.01); *G06F 17/30126* (2013.01); *G06F 17/30106* (2013.01); *G06F 17/30864* (2013.01); *G06F 17/30899* (2013.01)
USPC ............................. 707/822; 707/769; 707/770

(58) Field of Classification Search
CPC .................... G06F 17/30017; G06F 17/30106; G06F 17/30581; G06F 17/30067; G06F 17/30126; G06F 17/30864; G06F 17/30899
USPC ......................................... 707/769, 770, 822
See application file for complete search history.

(56) References Cited

U.S. PATENT DOCUMENTS

| | | | |
|---|---|---|---|
| 7,194,091 B2* | 3/2007 | Higashi et al. | 380/202 |
| 7,280,996 B2* | 10/2007 | Hayakawa et al. | 707/621 |
| 2002/0165721 A1* | 11/2002 | Chang | 704/503 |
| 2004/0250082 A1* | 12/2004 | Li et al. | 713/181 |
| 2005/0071425 A1 | 3/2005 | Chung et al. | |
| 2005/0226416 A1* | 10/2005 | Jung et al. | 380/228 |
| 2006/0195506 A1 | 8/2006 | Deng | |
| 2007/0183743 A1* | 8/2007 | Tanikawa et al. | 386/83 |
| 2007/0198435 A1* | 8/2007 | Siegal et al. | 705/67 |
| 2007/0204064 A1* | 8/2007 | Mail et al. | 709/246 |
| 2009/0044185 A1* | 2/2009 | Krivopaltsev | 717/173 |
| 2012/0011105 A1* | 1/2012 | Brock et al. | 707/694 |

* cited by examiner

*Primary Examiner* — Apu Mofiz
*Assistant Examiner* — Jared Bibbee
(74) *Attorney, Agent, or Firm* — Birch, Stewart, Kolasch & Birch, LLP (57) ABSTRACT

A terminal, server and method for identifying contents are discussed. According to an embodiment, the present invention provides a method for controlling content in a content identifying system, including receiving content related information regarding a content from a terminal; generating function information for calculating a content ID based on the content related information; transmitting the function information to the terminal; receiving a content ID generated based on the function information from the terminal; comparing the received content ID with stored content ID information; and performing at least one operation based on the comparison result.

19 Claims, 3 Drawing Sheets

Fig. 4

TERMINAL AND METHOD FOR IDENTIFYING CONTENTS

This application is the National Phase of PCT/KR2008/07622 filed on Dec. 23, 2008, which claims priority under 35 U.S.C. 119(e) to U.S. Provisional Application No. 61/027,750 filed on Feb. 11, 2008. The entire contents of these applications are hereby incorporated by reference into the present application.

TECHNICAL FIELD

The present invention relates to a terminal and method for securely identifying various contents and verifying the identification of contents within a network.

BACKGROUND ART

Technologies associated with mobile terminals are being rapidly developed and standardized, and such technologies are increasing transmissions and receptions of various contents among mobile terminals and network entities.

According to recent standardization documents of Open Mobile Alliance (OMA), a content identify manager (CIM) can be provided to identify various contents associated with mobile services.

Generally, a CIM, which is a network entity, generates content IDs for contents associated with terminals or services. In the related art, it is possible for two separately contents that are the same or substantially the same to have different content IDs. For instance, if a first user saves a picture A and sends to a second user who in turn saves the same picture A in a different format (e.g., different picture size, compression, etc.), then the CIM calculates and assigns different content IDs to the same content, picture A. As a result, the picture A of the first user and the picture A of the second user will have content IDs that are different from each other even through the same picture A (same content) is involved.

This creates various problems and limitations. Because the CIM alone generates content IDs, the CIM may be overloaded with the task of calculating content IDs and securely managing the content IDs in view of a large number of contents that are being exchanged in networks. Calculating different content IDs for the same or almost same contents by the CIM increases the network load. Moreover, it becomes more difficult to analyze such content IDs and to properly associate each content with a correct content ID. In addition, it may not be possible to have an effective global policy for standardizing the use and management of contents and content IDs.

DISCLOSURE OF INVENTION

Technical Solution

A technical goal of the present invention is to provide a terminal which assists a CIM in a content ID calculation task or which assists the CIM in generating an optimal content ID.

Another technical goal of the present invention is to provide a terminal, server and method for securely identifying contents and/or verifying the identification of the contents in an optimal manner.

Another technical goal of the present invention is to provide a terminal, server and method for calculating an optimal content ID for a content, which address the limitations and disadvantages associated with the related art.

According to an aspect of the present invention, there is provided a method for controlling content in a content identifying system, comprising: receiving content related information regarding a content from a terminal; generating function information for calculating a content ID based on the content related information; transmitting the function information to the terminal; receiving a content ID generated based on the function information from the terminal; comparing the received content ID with stored content ID information; and performing at least one operation based on the comparison result.

According to another aspect of the present invention, there is provided a terminal for controlling content in a network including a content identity manager (CIM), the terminal comprising: a transceiver configured to transmit and receive signals to and from the CIM; a controller configured to control the transceiver; and a content authenticator configured to calculate a content ID, wherein when the transceiver receives a particular content or the controller generates a particular content, the content authenticator generates content related information regarding the particular content, and transmits the generated content related information to the CIM using the transceiver, and the content authenticator calculates a content ID for the particular content based on function information received from the CIM, and transmits the calculated content ID to the CIM through the transceiver.

According to another aspect of the present invention, there is provided a method for controlling content in a content identifying system, comprising: receiving a first content ID and content related information of a content from a terminal; first comparing the first content ID with stored content ID information; generating function information for calculating a second content ID based on the first comparison result; receiving the second content ID generated based on the function information from the terminal; second comparing the second content ID with the stored content ID information; and performing at least one operation based on the second comparison result.

According to another aspect of the present invention, there is provided a terminal for controlling content in a network including a content identity manager (CIM), the terminal comprising: a transceiver configured to transmit and receive signals to and from the CIM; a controller configured to control the transceiver; and a content authenticator configured to calculate a content ID, wherein when the transceiver receives a particular content or the controller generates a particular content, the content authenticator calculates a first content ID for the particular content using a prestored content ID calculation function, and transmits the first content ID and content related information to the CIM using the transceiver, and the content authenticator calculates a second content ID for the particular content using function information received from the CIM, and transmits the second content ID to the CIM using the transceiver.

Advantageous Effects

The present invention allows a terminal to assist a content manager at a network side with the calculation of content IDs and identification of the contents. This reduces the network load and improves management of contents and corresponding content IDs in mobile communication environments.

MODE FOR THE INVENTION

Hereinafter, preferred embodiments of the present invention will be described in detail with reference to the accompanying drawings. The following embodiments should be considered in descriptive sense only and not for purpose of limitation.

A 'content' according to embodiments of the present invention can be any data, information, or signal in any form or type, and can be, for example, messages, requests, files, images, e-mails, texts, video and/or audio data, applications, etc. or any combination of these or other items.

Figure 1:
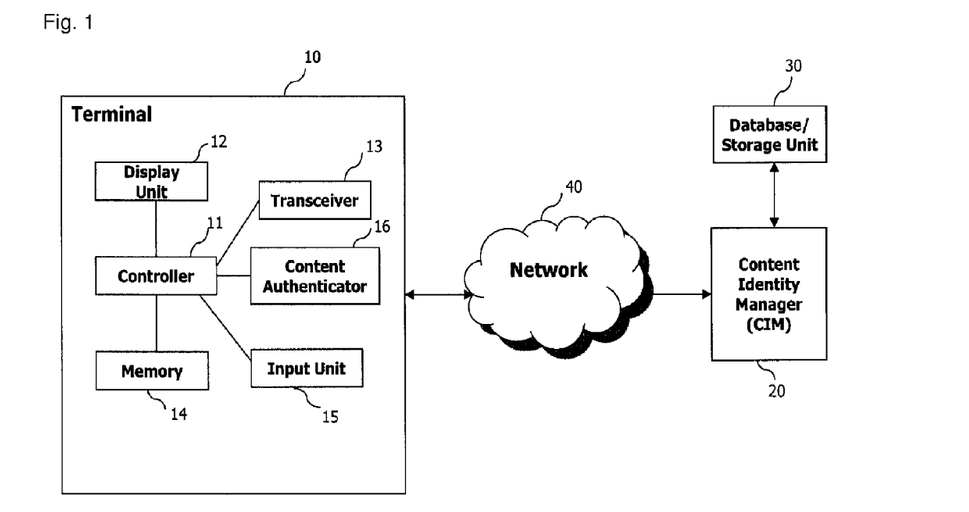
FIG. 1 is a block diagram of a system for identifying contents associated with a terminal according to an embodiment of the present invention.

FIG. 1 is a block diagram of a system for identifying contents associated with a terminal according to an embodiment of the present invention.

Referring to FIG. 1, the system includes a terminal 10 and a content identity manager (CIM) 20 configured to communicate with the terminal 10 through a network 40 such as a mobile communication network. The CIM 20 includes a database/storage unit 30 for storing contents and other information therein, or a separate database/storage unit 30 may be provided which is accessible by the CIM 20. The terminal 10 is also configured to communicate with other terminals or network entities such as a server via the network 40. All the components of the system are operatively coupled and configured.

The terminal 10 includes a controller or processor 11, a display unit 12 (e.g., LCD panel) for displaying contents and other information, a transceiver 13 for transmitting and receiving various signals, a memory or storage unit 14 for storing data and other information, an input unit 15, and a content authenticator 16 for calculating a content ID of a content. The terminal 10 can also include other known components such as a camera module, an audio output unit, touch screen, etc. All components of the terminal 10 are operatively coupled and configured.

The terminal 10 can be any device configured to communicate with the CIM 20. For example, the terminal 10 can be a mobile terminal, a mobile phone, a smart phone device, a computer notebook, a handset, a user equipment, a mobile station, a GPS device, a Bluetooth device, etc.

The CIM 20 can be a server or entity/module for managing content IDs associated with contents, e.g., contents communicated among mobile terminals and other network entities. The CIM 20 communicates with the storage unit 30 and the terminal 10 to ensure that each content is properly identified and/or stored in the storage unit 30. The CIM 20 also communicates with other CIMs, mobile terminals, and other network entities if needed.

The storage unit 30 preferably stores therein all contents involved, content IDs for those contents, and any rights information (e.g., copyright, copy protection, etc.) for each content. In a variation, the storage unit 30 may store contents, corresponding content IDs, and corresponding status information. The status information for each content may indicate a current status of the content. For example, if the content is a copy protected content, then the status information may indicate this. Or the status information may indicate that the content is a spam or has virus, in which case the terminal may delete or may not forward to others. The status information can come from the terminal or a server, where the server can be the CIM or another server. The CIM can forward the content to another server and request for the status of that content. In fact, the storage unit 30 can be configured to store any information associated with the contents, as desired.

Figure 2:
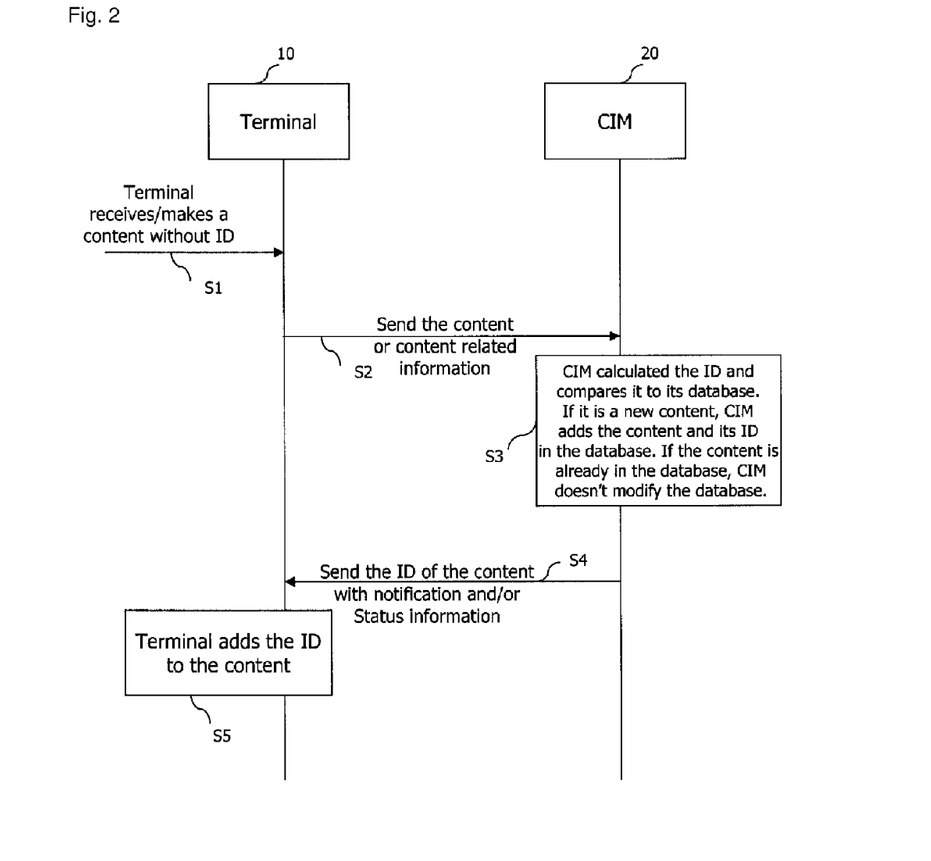
FIG. 2 is a flowchart illustrating a method for identifying contents associated with a terminal according to an embodiment of the present invention.

FIG. 2 is a flowchart illustrating a method for identifying contents associated with a terminal according to an embodiment of the present invention. The method of FIG. 2 is implemented in the system of FIG. 1, but can be implemented in other suitable systems.

Referring to FIG. 2, at step S1, the terminal 10 receives or generates a content without a content ID for identifying the content. For example, a user of the terminal takes a picture (content) using a camera of the terminal 10.

At step S2, the terminal 10 sends the content or content related information to the CIM 20, e.g., through the network 40. The content related information is a part of the content and/or any information or characteristics about or relating to the content. As non-limiting examples, the content related information can be, e.g., type of the content, size and/or author of the content, date of the creation of the content, the modification date of the content, etc.

At step S3, the CIM 20 receives the content or content related information, and calculates a content ID for the content using a content ID calculation function (also referred to as merely a function) and using the content or the content related information. The content ID calculation function can be any function or operation used to calculate a content ID, such as statistics function(s) or hash function(s). A hash function is a mathematical algorithm for converting a set of data into a smaller data, e.g., a single integer that may serve as an index. For example, a hash function may be applied to the received content or the received content related information to obtain one or more values as the content ID.

Then the CIM 20 compares the calculated ID with content IDs stored in the database 30. If the calculated ID is found within the stored content IDs, then the CIM 20 determines that the content is already stored in the database 30 and does not store the content in the database 30. As a result, the CIM 20 confirms or verifies the identity of the content.

On the other hand, if the calculated ID is not found within the stored content IDs, then the CIM 20 may determine that the content is a new content and thus the CIM 20 stores the content and the calculated content ID in the database 30. If the CIM 20 did not receive the content, the CIM 20 can send a request for it to the terminal 10. As a result, the CIM 20 assigns a content ID to the content for identifying the content.

In addition to storing the content and content ID, the database 30 may also store the status information associated with the content. If no status information is available for a content, the CIM can store the content as having a new status or a default status.

At step S4, the CIM 20 sends the calculated content ID for the content to the terminal 10. Here, additionally notification information and/or status information may also be sent from the CIM 20 to the terminal 10. The notification information can notify to the terminal 10 that the ID of the content is sent or being sent. The status information can indicate some status related to the content, e.g., copyright status, this content is a spam, etc.

At step S5, the terminal 10 associates the received content ID to the content and can store this information for future use. Accordingly, the content is effectively identified.

Figure 3:
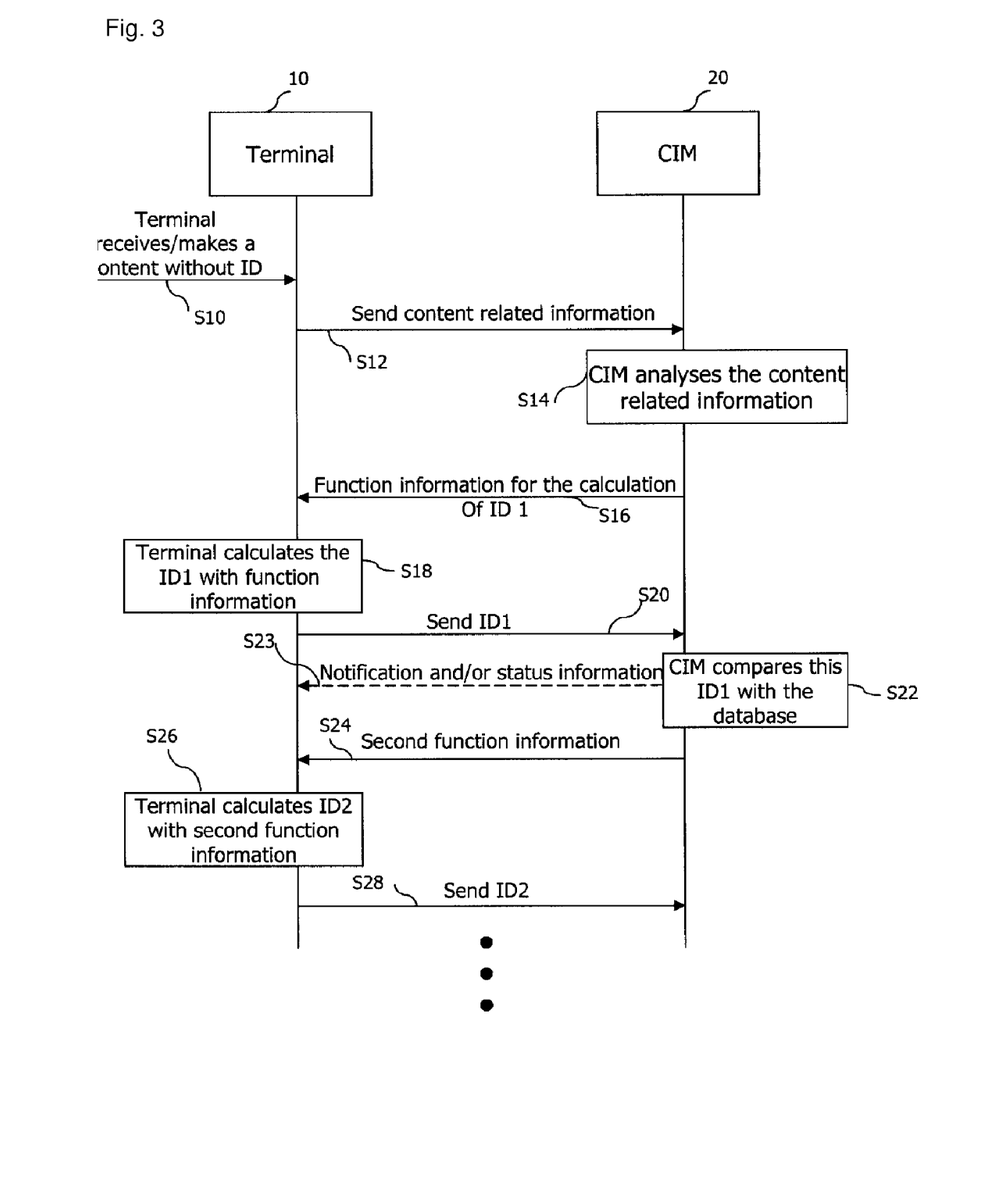
FIG. 3 is a flowchart illustrating a method for identifying contents associated with a terminal according to another embodiment of the present invention.

FIG. 3 is a flowchart illustrating a method for identifying contents associated with a terminal according to another embodiment of the present invention. The method of FIG. 3 is implemented in the system of FIG. 1, but can be implemented in other suitable systems.

Referring to FIG. 3, at step S10, the terminal 10 receives or generates a content without a content ID.

At step S12, the terminal 10 sends content related information for the content to the CIM 20, e.g., through the network 40.

Figure 4:
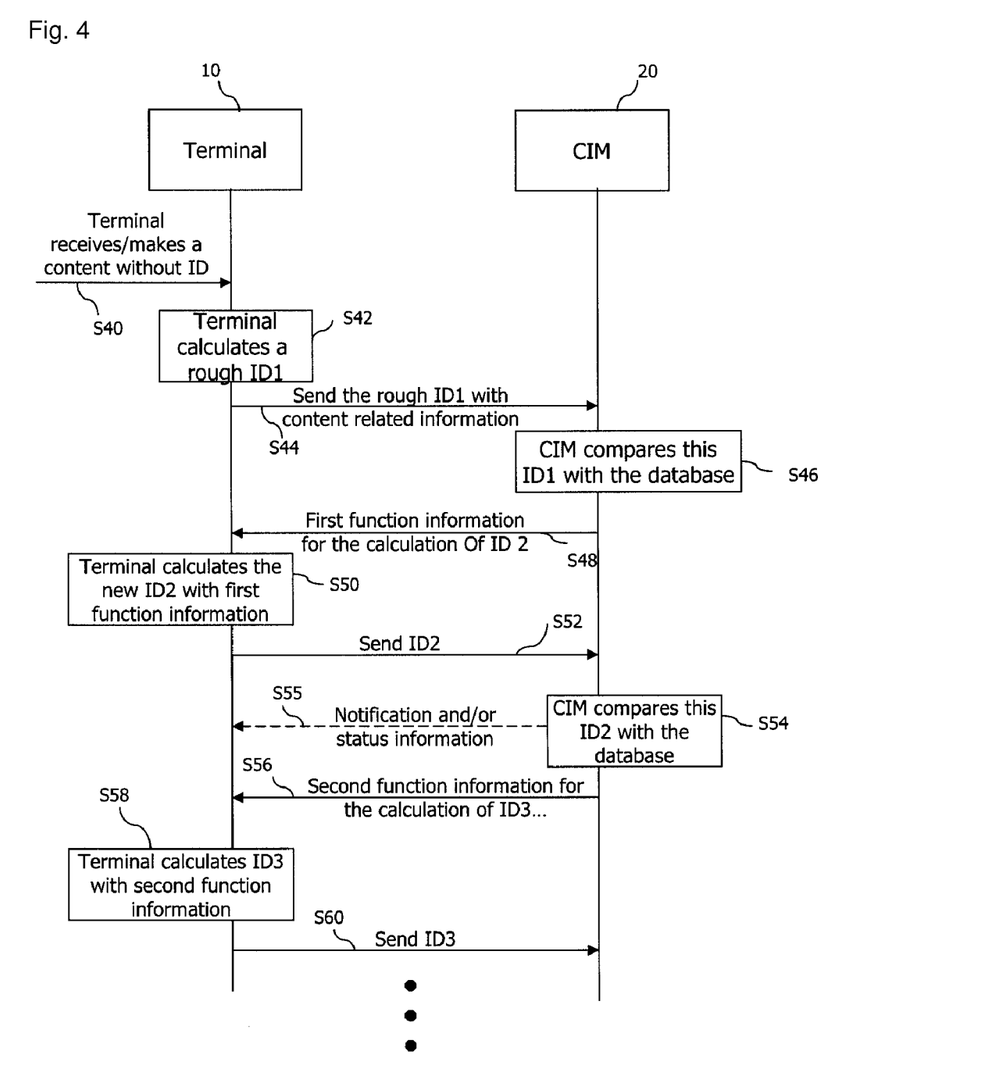
FIG. 4 is a flowchart illustrating a method for identifying contents associated with a terminal according to another embodiment of the present invention.

In various embodiments of the invention including FIGS. 2, 3 and 4, the content related information is a part of the content and/or any information or characteristics about or relating to the content. As non-limiting examples, the content related information can be one or more (or any combination) of the following:

only part(s) of the content;
type of the content (e.g., MP3, AVI, BMP, JPEG, etc.);
size and/or author of the content;
date of the creation of the content or the modification date of the content;
some characteristics about the type or other property of the content (e.g., size of the picture, B/N or color, etc.);
the ID of a part of the content if available;
several IDs of several parts of the content if available; and/or
primary ID (a rough ID) of the content if available.

At step S14, the CIM 20 receives the content related information and analyzes it to provide information (also referred to as function information) which the terminal 10 can use to calculate a content ID for the content in an optimized manner. The function information is any information, data, parameters, equations, function names, etc. that the terminal 10 can use to calculate an optimal or suitable content ID for the content.

In this regard, depending on the received content related information, the CIM 20 may decide that different hash function(s) should be used to calculate an optimal (more refined) content ID for the content. For example, depending on the type of the content, if the content related information indicates that the content involved is a song, then the CIM 20 may determine that a hash function A should be used to calculate the content ID, whereas if the content related information indicates that the content is a movie, then the CIM 20 may determine that a hash function B should be used to calculate the content ID. Then the determined result (e.g., use the hash function B) is included in the function information.

At step S16, once the CIM 20 determines the function information for the content involved, the CIM sends the determined function information (first function information) to the terminal 10. As a non-limiting example, the function information can be a specified function/algorithm (content ID calculation function) to be used to calculate the content ID, or just the name of the specified function, or the name of the specified function with parameters to be used in the specified function.

At step S18, the terminal 10 (e.g., content authenticator 16) receives the first function information from the CIM 20 and calculates a new ID (ID1) using the function information. At step S20, the terminal 10 sends the newly calculated ID (ID1) to the CIM 20.

At step S22, the CIM 20 compares the received ID1 with data (e.g., content IDs) stored in the database 30. If the ID1 is found within the content IDs stored in the database 30 and only one content associated with the ID1 is found in the database 30, then the process can end by the CIM 20 sending notification information and/or status information to the terminal 10 at step S23. The notification information may indicate to the terminal 10 that the ID1 is now the final/stored content ID for the content. The status information is already discussed above. Further, the status information may be stored in the database 30 as discussed above. On the other hand, if the ID1 is not found in the database 30, then the CIM 20 stores the content (since it is considered a new content) and the associated ID1 in the database 30, and the terminal 10 may be notified accordingly. If the content is not available, the CIM 20 may request for it from the terminal 10 or another source.

However, at step S24, if multiple contents associated with the ID1 are found in the database 30, then the CIM 20 generates and sends new or additional (more refined) function information to the terminal 10. The new or additional function information (second function information) can be any information that can be used by the terminal 10 to calculate a more optimized (refined) content ID for the content. For example, if multiple contents exist in the database 30 that are assigned to the ID1, then the CIM 20 may generate new or modified content ID calculation function(s) based on some other parts of the content related information. That is, the CIM 20 may generate a modified content ID calculation function (or more sophisticated function) which can generate different content IDs for similar contents. Then the generated function itself, or the name of the generated function, or the name of the generated function with parameters, etc. may be included in the second function information.

To enhance understanding, Table 1 below is given as an example of data stored in the database 30.

TABLE 1

| Content ID | Content |
|---|---|
| ID1 | CONTENT X |
| ID1 | CONTENT X' |
| ID4 | CONTENT Z |

As shown in Table 1, contents and corresponding content IDs are stored in the database 30. In step S24 when comparing the received ID1 to data stored in Table 1, for example, the CIM 20 determines that two similar contents (CONTENT X and CONTENT X') both have the same ID. Thus the CIM 20 determines that an additional and/or modified content ID calculation function (second function information) may need to used to figure out which one of the two contents corresponds to the content in the terminal 10. The CIM 20 can send the second function information to the terminal at step S24.

At step S26, the terminal 10 (e.g., content authenticator 16) calculates a new content ID (ID2) for the content using the second function information.

At step S28, the terminal 10 sends the calculated ID2 to the CIM 20. At this point, step S22 is repeated using the ID2. The process may end thereafter or can continue by sending any additional function information and calculating more optimized/refined ID(s) similar to steps S24, S26 and S28. In fact, these steps can be repeated until the CIM 20 finds that the currently generated ID (or substantially similar ID) exists in the stored content IDs with a single content associated thereto. In another variation, the CIM 20 may determine a maximum number of content ID calculation iterations that may be performed for each content, and after the last iteration, there is still no content ID match with the content IDs stored in the database 30, then the CIM 20 may store the last calculated content ID as the final content ID for the content. If the content is not available, the CIM 20 may request for the content so that the content and the last calculated content ID can be stored together in the database 30.

Once the optimal content ID is calculated, decided, or found in the database 30, then the CIM 20 may notify the terminal 10 by sending notification and/or status information (and the final content ID if not known by the terminal). The notification information can indicate to the terminal 10 what the finally stored content ID may be.

As a variation, in the data comparing steps, e.g., step 22 of FIG. 3 or steps S46 and 54 of FIG. 4 (to be discussed below), similarity between a content ID and stored content IDs may also be analyzed to determine if the contents corresponding to such content IDs are very similar using known mathematical functions such as Hamming codes. This analysis may be performed based on a premise that if the contents are similar, then their content IDs would be linearly and correspondingly similar. For example, a Hamming code may be used to determine a difference between a currently calculated content ID and a stored content ID. If such a difference is within a preset range, then the CIM may determine that the corresponding contents are to be considered the same (even if there may be minor differences), and the currently calculated content ID may not be stored in the database since a content ID for that content is already stored in the database. On the other hand, if the calculated content ID difference is outside the preset range, then the CIM may determine that the corresponding contents are not that similar and thus, the currently calculated content ID and its corresponding content may be stored in the database 30. As a result, contents that are very similar may be treated as the same content and are given one same content ID. This helps to simplify the identification, verification and management of various contents and their IDs in the network, and reduces the network load and bandwidth use.

In still another variation, in the data comparing steps, e.g., step 22 of FIG. 3 or steps S46 and 54 of FIG. 4 (to be discussed below), if a currently calculated content ID exists in the content IDs stored in the database 30, then a further analysis may be performed to verify that the content for the calculated content ID and the content for the matching stored content ID are indeed the same or very similar. This may be done by analyzing the content related information associated with the content of the currently calculated content ID with the content of the matching stored content ID. If this analysis indicates that the contents may not be the same or very similar, then the CIM may send a new or more refined function to the terminal 10 so that a new content ID for the current content may be calculated using the new function.

FIG. 4 is a flowchart illustrating a method for identifying contents associated with a terminal according to another embodiment of the present invention. The method of FIG. 4 is implemented in the system of FIG. 1, but can be implemented in other suitable systems.

Referring to FIG. 4, at step S40, the terminal 10 receives or generates a content without a content ID.

At step S42, the terminal 10 (e.g., content authenticator 16) calculates a rough ID (ID1) for the content using a content ID calculation function. For example, the rough ID for the content may be calculated using a prestored hash or other mathematical function by the terminal 10. If the content is an MP3 file, then the terminal 10 may use a prestored hash function 1 to calculate the content ID, whereas if the content is a movie file, then the terminal 10 may use a prestored hash function 2. One or more prestored functions usable in step S42 can be stored, updated, and modified by the CIM 20 using a SIM card or other storage card via Over-the-Air (OTA) operation or using some other communication methods.

At step S44, the terminal 10 sends the calculated ID1 and content related information for the content to the CIM 20, e.g., through the network 40. As discussed above, the content related information is a part of the content and/or any information or characteristics about or relating to the content.

At step S46, the CIM 20 compares the received ID1 with data (e.g., content IDs) stored in the database 30. If the ID1 is found in the database 30 with one single content associated thereto, then the process may end here. For instance, the notification information notifying the terminal that the ID1 is the finally store content ID, may be sent to the terminal 10 from the CIM 20. Further, the status information for the content, stored in the database 30, may be sent to the terminal 10.

If the CIM 20 determines that the ID1 (or an ID substantially similar to the ID1) is not found in the database 30, then the CIM stores the content ID1 and the content in the database 30.

On the other hand, if multiple contents stored in the database 30 have the same ID1, then the CIM 20 analyzes the received content related information and generates first function information which the terminal 10 can use to calculate a content ID in a more optimal/refined manner. As mentioned above, the function information in the various embodiments is any information, data, parameters, equations, function names, etc. that the terminal 10 can use to calculate a more optimal/refined content ID for the content.

At step S48, once the CIM 20 determines the function information for the content involved, the CIM 20 sends the determined function information (first function information) to the terminal 10.

At step S50, the terminal 10 (e.g., content authenticator 16) receives the first function information from the CIM 20 and calculates a new content ID or more refined content ID (ID2) using the first function information. At step S52, the terminal 10 sends the newly calculated ID (ID2) to the CIM 20.

At step S54, the CIM 20 compares the received ID2 with data (e.g., content IDs) stored in the database 30. If the ID2 is found within the content IDs stored in the database 30 and corresponds to one content stored in the database 30, then the process can end by the CIM 20 sending the notification and/or status information to the terminal 10 at step S55. The notification information can indicate to the terminal 10 that the ID2 is now the final/stored content ID for the content. The status information is already discussed above. If the ID2 (or an ID substantially similar to the ID2) is not found in the database 30, then the content and the ID2 are stored in the database 30 and the terminal 10 may be notified accordingly.

However, at step S56, if multiple contents associated with the ID2 are found in the database 30 (e.g., there are two contents that have the same ID2), then the CIM 20 generates and sends new or additional function information to the terminal 10. The new or additional function information (second function information) can be any information that can be used by the terminal 10 to calculate a more optimized/refined content ID for the content.

At step S58, the terminal 10 (e.g., content authenticator 16) calculates a new content ID (ID3) for the content using the second function information. At step S60, the terminal 10 sends the calculated ID3 to the CIM 20.

At this point after step S60, step S54 may be repeated using the ID3. The process may end thereafter or can continue by sending any additional function information to the terminal and calculating more optimized ID(s) by the terminal similar to steps S56, S58 and S60. In fact, these steps scan be repeated until the CIM 20 finds that the currently generated ID exists in the stored content IDs with a single content associated thereto, or the currently generated ID is very similar to one stored in the database 30 in association with one content. Once the optimal content ID is calculated, decided, or found in the database 30, then the CIM 20 may notify the terminal 10 by sending the notification and/or status information (and the final content ID if not known by the terminal). The notification information can indicate what the final content ID is for the content in the terminal.

Step S48 and steps thereafter in FIG. 4 can be the same as or similar to step S16 and steps thereafter in FIG. 3, except that different ID numbers (e.g., ID1 versus ID2) are involved. Also in FIGS. 3 and 4, if an optimal content ID is found or calculated, the CIM 20 can store the content in association with the optimal content ID in the database 30. If the content is not provided, the CIM 20 may request for it from the terminal 10 so that the content can be stored in association with the content ID.

According to the invention, various methods for analyzing and comparing content IDs with data stored in the database 30 may be used.

Now, some examples of calculating a content ID by the terminal and generating the function information (e.g., first function information, second function information, etc.) and updating data stored in the database 30 by the CIM, will be discussed below. These are non-limiting examples of variations in the embodiments of the invention. Some features may be applicable to FIGS. 2-4.

In this example, a very simple SUM function is used to calculate a content ID. However, the invention is not limited thereto and preferably utilizes hash functions or statistic functions.

Assume the database 30 stores therein the following information (only 2 values in this example):

| Content ID | Content | Status | Functions |
|---|---|---|---|
| 05 | [02 03] | Xx | Fct1 |
| 12 | [10 02] | xx | Fct1 |

For each content, the content ID, status information and function are stored. The function (last column) used to calculate the content ID is the SUM module 2digits, and the name of this function is labeled as Fct1. The terminal 10 (and any other associated terminal) has this function, e.g., at step S42.

First Process:

If the terminal 10 receives or generates a content: CONTENT1: [10 11 12 13 14 15 16], the function Fct1 is used by the terminal 10 to calculate a content ID of this content as follows:

ID1=fct1(CONTENT1)

ID1=fct1([10 11 12 13 14 15 16])=10+11+12+13+14+ 15+16=91.

As a result, the content ID of 91 is calculated for CONTENT1, and the terminal sends ID1=91 to the CIM 20, e.g., at steps S42 and S44, or steps S18 and S20.

The CIM 20 may add this new ID in the database 30 since it is not found in the database 20. The CIM 20 may ask for the content and its status and add them in the database 30 (e.g., at step S46 or S22) as follows:

| Content ID | Content | Status | Functions |
|---|---|---|---|
| 05 | [02 03] | Xx | Fct1 |
| 12 | [10 02] | xx | Fct1 |
| 91 | [10 11 12 13 14 15 16] | xx | Fct1 |

Second Process:

Assume another terminal (terminal 2) (or the terminal 10) has a new content: CONTENT2=[16 11 12 13 14 15 10], and the terminal 2 calculates the content ID for CONTENT2 using the function Fct1 as follows:

ID1=Fct1([16 11 12 13 14 15 10])=16+11+12+13+ 14+15+10=91.

The terminal 2 sends this content ID to the CIM. However, this content ID (=91) already exists in the database 30, but the contents seem similar. In such a case, depending on the degree of similarity (e.g., based on the content related information and/or use of Hamming codes), the CIM 20 may determine that CONTENT1 and CONTENT2 are similar enough not to assign a new content ID (the terminal 2 may be notified that the ID of CONTENT2 is 91), or that a new or more refined function is needed to further distinguish contents such as CONTENT1 and CONTENT2. In this example, the CIM 20 determines or selects a new or more refined function such as a function fct2 where the fct2 takes the last number of the content as part of the content ID. Accordingly, the CIM may calculate the new ID only for the contents having the same ID.

As a result, the database 30 is updated as follows:

| Content ID | Content | Status | Functions |
|---|---|---|---|
| 05 | [02 03] | Xx | Fct1 |
| 12 | [10 02] | xx | Fct1 |
| 91, 16 | [10 11 12 13 14 15 16] | xx | Fct1, fct2 |
| 91, 10 | [16 11 12 13 14 15 10] | xx | Fct1, fct2 |

In the above, an ID of CONTENT1 [10 11 12 13 14 15 16] is now composed of two numbers, 91 (obtained from Fct1) and 16 (obtained from Fct2=last number of the content). Similarly, an ID of CONTENT2 [16 11 12 13 14 15 10] is 91, 10. The CIM then can send information about the new function to all applicable terminals so each terminal may use the modified/refined function to calculate a content ID.

If the terminal 10 or another terminal has a new content? CONTENT3 [16 11 11 13 14 15 11], then this terminal calculates a content ID for the new content CONTENT3 using the modified function (Fct1, fct2). As a result, the content ID of 91, 11 is calculated, which is sent to the CIM.

This content ID (91, 11) does not exist in the database. As such, the new content CONTENT3 may be sent from the terminal to the CIM and the database is updated to include the new content and associated information as follows:

| Content ID | Content | Status | Functions |
|---|---|---|---|
| 05 | [02 03] | Xx | Fct1 |
| 12 | [10 02] | xx | Fct1 |
| 91, 16 | [10 11 12 13 14 15 16] | xx | Fct1, fct2 |
| 91, 10 | [16 11 12 13 14 15 10] | xx | Fct1, fct2 |
| 91, 11 | [16 11 11 13 14 15 11] | xx | Fct1, fct2 |

After a certain number of steps (e.g., N steps), the database 30 may include the following data:

| Content ID | Content | Status | Functions |
|---|---|---|---|
| 05 | [02 03] | Xx | Fct1 |
| 06 | [00 00 00 02 03 01] | Xx | Fct1 |
| 11 | [00 00 09 00 02] | Xx | Fct1 |
| 12 | [10 02] | xx | Fct1 |
| 91, 10 | [16 11 12 13 14 15 10] | xx | Fct1, fct2 |
| 91, 11 | [16 11 11 13 14 15 11] | xx | Fct1, fct2 |
| 91, 16 | [10 11 12 13 14 15 16] | xx | Fct1, fct2 |
| 91, 45 | [10 … 45] | xx | Fct1, fct2 |
| 91, 91 | [91] | xx | Fct1, fct2 |

M Processes:

The terminal 10 or another terminal (terminal M) may have a new content: CONTENTM=[80 11]. Using the applicable function, the terminal calculates the content ID for CONTENTM to be 91, 11. Here, 91 and 11 are sub IDs (ID1 and ID2) that make up the content ID.

The terminal then sends the content ID (ID1, ID2) to the CIM. The CIM determines that this content ID (91, 11) already exists in the database (this means different contents (not similar contents) may have the same content ID). The CIM then generates a new function fct3 (new function information) to be used by the terminal to calculate a more refined content ID. For example the new function may be using the size of the file/content.

The terminal calculates a new/refined content ID for CONTENTM using the new function fct3. For instance, a sub ID (ID3) which is part of the content ID may be generated using the new function fct3. In this example, ID3=fct3([80 11])=03. This new ID (just the sub ID or the full content ID) is sent to the CIM and the database 30 is updated as follows (the updated parts involve fct3):

| Content ID | Content | Status | Functions |
|---|---|---|---|
| 05 | [02 03] | Xx | Fct1 |
| 06 | [00 00 00 02 03 01] | Xx | Fct1 |
| 11 | [00 00 09 00 02] | Xx | Fct1 |
| 12 | [10 02] | xx | Fct1 |
| 91, 10 | [16 11 12 13 14 15 10] | xx | Fct1, fct2 |
| 91, 11, 7 | [16 12 11 13 13 15 11] | xx | Fct1, fct2, fct3 |
| 91, 11, 2 | [80 11] | xx | Fct1, fct2, fct3 |
| 91, 11 | [16 11 11 13 14 15 11] | xx | Fct1, fct2 |
| 91, 16 | [10 11 12 13 14 15 16] | xx | Fct1, fct2 |
| 91, 45 | [10 … 45] | xx | Fct1, fct2 |
| 91, 91 | [91] | xx | Fct1, fct2 |

The CIM can send information about the new function (e.g., fct3) to all applicable terminals. The CIM can also update the existing content IDs using the new function(s), if applicable.

With this new function, the CIM can try to optimize the scheduling or set the order in which different sub IDs of a content ID may be calculated. For instance, the CIM can calculate the ID3 for all applicable contents and thereafter send the order in which the sub IDs may be calculated to each applicable terminal. For example, the first sub ID is to be calculated with the fct1, the second sub ID is to be calculated with the fct3, and the last sub ID is to be calculated with the fct2.

The functions used to calculate the content ID or sub ID can be selected differently based on the type of the content as follows:

| Content ID | Content | Status | Type | Functions |
|---|---|---|---|---|
| 05 | [02 03] | Xx | Data | Fct1 |
| 05 | File1.MP3 | Copyright | MP3 | Fct4 |
| 06 | [00 00 00 02 03 01] | Xx | Data | Fct1 |
| 11 | [00 00 09 00 02] | Xx | Data | Fct1 |
| 11 | Picture1.jpg | xx | JPEG | Fct6 |
| 12 | [10 02] | xx | Data | Fct1 |
| 12 | File2.MP3 | Copyright | MP3 | Fct4 |
| 18 | File12.MP3 | Copyright | MP3 | Fct4 |
| 25, 11 | File21.MP3 | Copyright | MP3 | Fct4, fct14 |
| 25, 12 | File145.MP3 | Copyright | MP3 | Fct4, fct14 |
| 91, 11 | [16 11 11 13 14 15 11] | xx | Data | Fct1, fct2 |
| 91, 16 | [10 11 12 13 14 15 16] | xx | Data | Fct1, fct2 |
| 99 | Picture2.jpg | xx | JPEG | Fct6 |
| 100 | Picture728.jpg | xx | JPEG | Fct6 |
| 1200 | Picture78.jpg | xx | JPEG | Fct6 |

In the above, for example, the function fct6 is used for calculating content IDs for pictures, the functions fct4 and fct14 are used for calculating content IDs for MP3 files, etc. Also, in the above example, the MP3 files are saved with specific status, e.g., copyright.

In the above various embodiments, each of the terminal and CIM can select a content ID calculation function (e.g., type of hash function) depending on the type of the content. Each part of a content can have a specific hash function or other function that can be used to calculate a sub ID for the content. Also, one part of a content may be hashed using multiple hash functions that may generate corresponding multiple sub IDs. In such cases, the content ID of the content may be a combination of such sub IDs (e.g., the content ID can be composed of several sub IDs), or may be generated by applying a function to the sub IDs. Furthermore, other types of content ID calculation functions may be used. For example, a checksum function is another example of a content ID calculation function. Moreover, if at some point that the CIM 20 determines that there is no matching content ID in the database 30, then the CIM 20 may ask the terminal 10 to send the entire content so that the CIM 20 may store the content, the latest calculated content ID and the status information in association with each other in the database 30.

While the present invention has been particularly shown and described with reference to exemplary embodiments thereof, it will be understood by those skilled in the art that various changes in form and details may be made therein without departing from the spirit and scope of the present invention as defined by the appended claims.

Industrial Applicability

The present invention may be applicable to a terminal and network entity that provide identifications of contents.

The invention claimed is:

1. A method for controlling content in a content identifying system, comprising:
   receiving, by a network entity, content related information regarding a content from a mobile terminal;
   generating, by the network entity, function information for calculating a content ID according to content file type information included in the content related information, wherein different function information is used by the mobile terminal to calculate a content ID for each different content file type;
   transmitting, by the network entity, the function information to the mobile terminal;
   receiving, by the network entity, a content ID generated based on the function information from the mobile terminal;

comparing, by the network entity, the received content ID with stored content ID information; and performing, by the network entity, at least one operation based on the comparison result, wherein the at least one operation includes:

requesting the content from the mobile terminal, if the comparing step indicates that the received content ID does not match data stored in the stored content ID information;

receiving the requested content from the mobile terminal; and storing the received content with the content ID.

2. The method of claim 1, wherein the at least one operation includes:

transmitting the received content ID with content status information to the mobile terminal, if the comparing step indicates that there exists, in the stored content ID information, a content ID which corresponds to the received content ID and which is associated with one content.

3. The method of claim 1, wherein the at least one operation includes:

transmitting another function information for calculating a new content ID to the mobile terminal, if the comparing step indicates that there exists, in the stored contend ID information, a content ID which corresponds to the received content ID but is associated with at least two contents.

4. The method of claim 1, wherein the network entity corresponds to a Content Identify manager (CIM).

5. The method of claim 1, wherein the function information includes one of the following:

a name of a mathematical function to be used to calculate a content ID; or a mathematical function to be used to calculate a content ID; or a mathematical function or a name of the mathematical function to be used to calculate a content ID, and parameters to be used in the mathematical function.

6. The method of claim 1, wherein the generating step generates different function information depending on the content file type information included in the content related information.

7. The method of claim 1, wherein the function information indicates a hash function or a statistical function to be used to calculate a content ID.

8. A mobile terminal for controlling content in a network, the mobile terminal comprising:

a transceiver configured to:

transmit content related information regarding a content to a network entity, and receive function information from the network entity, wherein the function information is generated by calculating a content ID according to content file type information included in the content related information, wherein different function information is used by the mobile terminal to calculate a content ID for each different content file type; and a content authenticator configured to generate a content ID based on the received function information, wherein the transceiver is further configured to:

transmit the generated content ID to the network entity;

receive a request for the content from the network entity if the transmitted content ID does not match data stored in stored content ID information; and transmit the requested content to the network entity.

9. The mobile terminal of claim 8, wherein the transceiver receives notification information and status information from the network entity, the notification information indicating that the calculated content ID is the ID for the particular content, the status information pertaining to a status of the particular content.

10. The mobile terminal of claim 8, wherein the function information includes one of the following:

a name of a mathematical function to be used to calculate a content ID; or a mathematical function to be used to calculate a content ID; or a mathematical function or a name of the mathematical function to be used to calculate a content ID, and parameters to be used in the mathematical function.

11. The mobile terminal of claim 8, wherein the function information indicates a hash function or a statistical function to be used to calculate a content ID.

12. A method for controlling content in a content identifying system, comprising:

receiving, by a network entity, at least a first content ID and content related information of a content from a mobile terminal, wherein different function information is used by the mobile terminal to calculate a content ID for each different content file type;

comparing, by the network entity, the first content ID with stored content ID information; and performing, by the network entity, at least one operation based on the comparison result, wherein the at least one operation includes:

requesting the content from the mobile terminal, if the comparing step indicates that the first content ID does not match data stored in the stored content ID information;

receiving the requested content from the mobile terminal; and storing the received content with the first content ID.

13. The method of claim 12, wherein the at least one operation includes:

transmitting notification information pertaining to the first content ID to the mobile terminal, if the comparing step indicates that the first content ID exists in the stored content ID information and a content ID which corresponds to the first content ID is associated with one content.

14. The method of claim 12, wherein the at least one operation includes:

generating, by the network entity, function information for calculating a new content ID using the content related information, if the comparing step indicates that the first content ID exists in the stored content ID information but a content ID which corresponds to the first content ID is associated with at least two contents; and transmitting the generated function information for calculating the new content ID to the mobile terminal.

15. The method of claim 12, wherein the network entity corresponds to a Content Identify manager (CIM).

16. The method of claim 14, further comprising:

receiving, by the network entity from the mobile terminal, a second content ID generated based on the function information generated by the network entity; and comparing, by the network entity, the second content ID with the stored content ID information.

17. A mobile terminal for controlling content in a network, the mobile terminal comprising:

a content authenticator configured to generate a first content ID of a content based on a content file type of the content; and a transceiver configured to transmit at least the first content ID and content related information to a network entity, wherein the transceiver is further configured to receive function information from the network entity, wherein the content authenticator is further configured to generated a second content ID using the function information received from the network entity, wherein different function information is used by the mobile terminal to calculate a content ID for each different content file type, and wherein the transceiver is further configured to:

receive a request for the content from the network entity if the transmitted first content ID does not match data stored in stored content ID information, and transmit the requested content to the network entity.

18. The mobile terminal of claim 17, wherein the function information includes one of the following:

a name of a mathematical function to be used to calculate a content ID; or a mathematical function to be used to calculate a content ID; or a mathematical function or a name of the mathematical function to be used to calculate a content ID, and parameters to be used in the mathematical function.

19. The mobile terminal of claim 17, wherein the function information indicates a hash function or a statistical function to be used to calculate a content ID.

\* \* \* \* \*